(12) United States Patent
Beardsworth et al.

(10) Patent No.: US 8,334,489 B2
(45) Date of Patent: Dec. 18, 2012

(54) PHOTOVOLTAIC SYSTEM WITH MANAGED OUTPUT AND METHOD OF MANAGING VARIABILITY OF OUTPUT FROM A PHOTOVOLTAIC SYSTEM

(75) Inventors: Greg Beardsworth, San Francisco, CA (US); Matt Campbell, Berkeley, CA (US); Steve Kraft, Albany, CA (US); Jason Jones, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 350 days.

(21) Appl. No.: 12/721,372

(22) Filed: Mar. 10, 2010

(65) Prior Publication Data

US 2011/0224831 A1 Sep. 15, 2011

(51) Int. Cl.
*G01C 21/00* (2006.01)
*F24J 2/38* (2006.01)

(52) U.S. Cl. .................. 250/203.4; 250/203.1; 126/572; 126/600

(58) Field of Classification Search ............... 250/203.1, 250/203.3, 203.4; 136/244, 246; 126/572, 126/573, 600; 700/297
See application file for complete search history.

(56) References Cited

U.S. PATENT DOCUMENTS

2010/0006140 A1* 1/2010 Parker et al. .................. 136/246
2010/0175741 A1* 7/2010 Thorne ......................... 136/251

* cited by examiner

*Primary Examiner* — Kevin Pyo
(74) *Attorney, Agent, or Firm* — Blakely Sokoloff Taylor Zafman LLP

(57) ABSTRACT

Photovoltaic systems with managed output and methods for managing variability of output from photovoltaic systems are described. A system includes a plurality of photovoltaic modules configured to receive and convert solar energy. The system also includes a sensor configured to determine an orientation for each of the plurality of photovoltaic modules, the orientations based on a maximum output from the photovoltaic system. The system also includes an orientation system configured to alter the orientation of one or more of the plurality of photovoltaic modules to provide a reduced output from the photovoltaic system, the reduced output less than the maximum output.

9 Claims, 3 Drawing Sheets

PHOTOVOLTAIC SYSTEM WITH MANAGED OUTPUT AND METHOD OF MANAGING VARIABILITY OF OUTPUT FROM A PHOTOVOLTAIC SYSTEM

TECHNICAL FIELD

Embodiments of the present invention are in the field of renewable energy and, in particular, photovoltaic systems with managed output and methods of managing variability of output from photovoltaic systems.

BACKGROUND

Common types of photovoltaic deployment include off-grid and on-grid systems. Off-grid systems are typically small (e.g., 10s of kilowatts at most) and tied closely to an energy storage system such as a system of deep-cycle lead acid batteries or, in some cases, to a fueled gen-set. In an off-grid configuration, the energy stored in the battery acts as a buffer between energy production and demand. As such, short-term variability, such as peak collection, in the solar resource may not be an issue. On-grid systems, by contrast, may be quite large, with systems up to the 100s of megawatts. To date, sizing of on-grid systems may be such that existing methods of handling load variability (e.g., by provision of ancillary services from generators on the grid) have been sufficient to ensure stability of the grid.

However, with advances in photovoltaic system technology, ever larger systems are being proposed and actually installed for use. Such larger systems may pose challenges for power management in at least two end markets, e.g., in island- or micro-grid systems or in very large photovoltaic plants integrated onto large grids. In either case, there may be restrictions on the maximum solar energy collection capability with respect to the sizing capability of an associated power conditioner of a power plant. Typically, the proposed method of managing peak or variable output of renewable generating resources is to add an energy storage component or to subdue plant power production. However, there may be a lack of reliable, commercially proven, and cost effective storage unit compatible with a facility scale at the 100s of kilowatts level or higher, or there may be issues associated with inverter controls or power conditioning controls at an inverter.

Furthermore, one of the major challenges for solar photovoltaic power plants may be that, at present, owners and operators have very little control of the electrical output of a power plant in the short-term (e.g., on the hours and minutes scale). Having more control over the output of the power plant may be desirable since such control may be used to ensure that plant operations are increasingly economic or practical. More control may also become a minimum requirement for some large photovoltaic power plants, due to limitations of the existing electrical grid and its ability to cope with load variability. The current lack of output control in the hourly or minutely timeframe may be due to at least two independent factors: (1) the inherent short-term variability of sunlight due to cloud cover and other weather phenomena, and (2) the technological state of the art for a photovoltaic power plant may be such that the instantaneous electricity output of the plant directly correlates to the amount of sunlight received at each moment.

DETAILED DESCRIPTION

Figure 1:
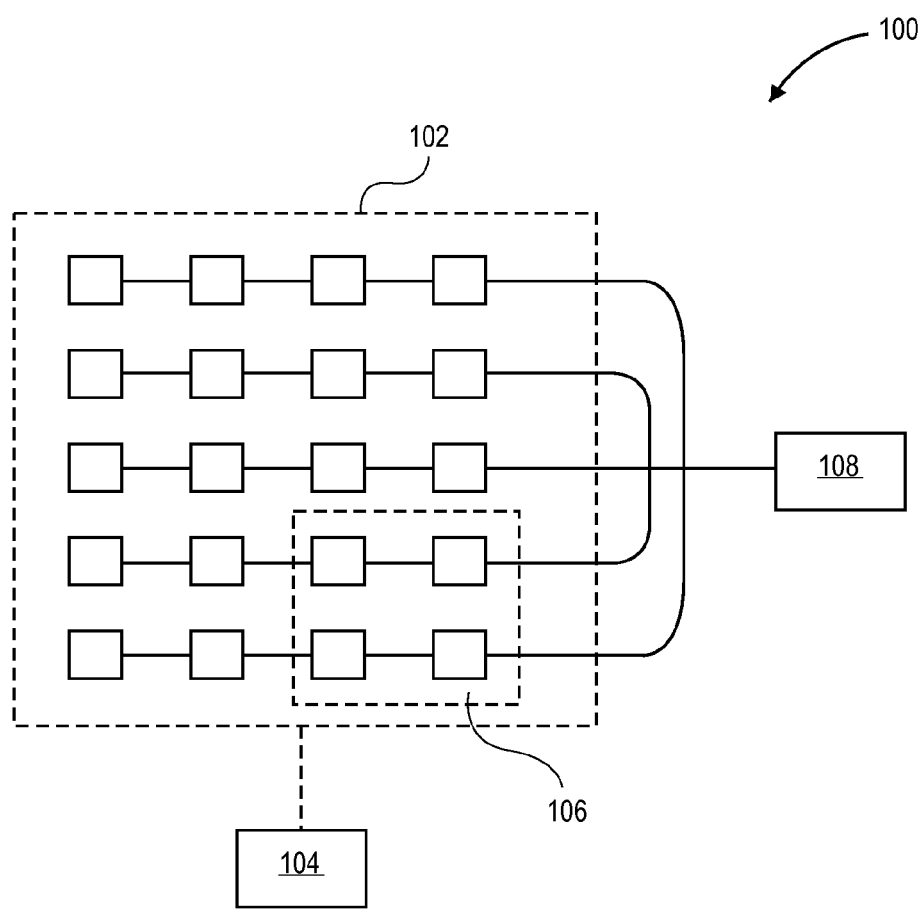
FIG. 1 illustrates a block diagram of a photovoltaic system with managed output, in accordance with an embodiment of the present invention.

Photovoltaic systems with managed output and methods of managing variability of output from photovoltaic systems are described herein. In the following description, numerous specific details are set forth, such as specific approaches to reducing output, in order to provide a thorough understanding of the present invention. It will be apparent to one skilled in the art that embodiments of the present invention may be practiced without these specific details. In other instances, well-known data collection techniques, such as insolation data collection, are not described in detail in order to not unnecessarily obscure embodiments of the present invention. Furthermore, it is to be understood that the various embodiments shown in the Figures are illustrative representations and are not necessarily drawn to scale.

Disclosed herein are photovoltaic systems with managed output. In one embodiment, a system includes a plurality of photovoltaic modules configured to receive and convert solar energy. The system also includes a sensor configured to determine an orientation for each of the plurality of photovoltaic modules, the orientations based on a maximum output from the photovoltaic system. The system further includes an orientation system configured to alter the orientation of one or more of the plurality of photovoltaic modules to provide a reduced output from the photovoltaic system, the reduced output less than the maximum output.

Also disclosed herein are methods of managing variability of output from photovoltaic systems. In one embodiment, a method includes determining an orientation for each of a plurality of photovoltaic modules, the orientations based on a maximum output from the photovoltaic system. The method also includes altering the orientation of one or more of the plurality of photovoltaic modules to provide a reduced output from the photovoltaic system, the reduced output less than the maximum output. In one embodiment, a method includes providing a plurality of photovoltaic modules, each photovoltaic module having a solar energy collection capability. The method also includes reducing a solar energy collection capability of one or more of the plurality of photovoltaic modules to provide a reduced output from the photovoltaic system, the reduced output less than a maximum output from the photovoltaic system.

In accordance with an embodiment of the present invention, intentionally reducing the output of a photovoltaic system by purposefully tilting away from maximum collection orientation one or more solar modules from a plurality of solar modules in the system accommodates for a maximum input capability at an associated power conditioner of a power plant. The maximum input capability at the power plant may be less than the maximum output of the associated photovoltaic system in some solar conditions. Other approaches may include de-tuning the power output of the photovoltaic system by manipulating an inverter between the photovoltaic system and the power plant. Such de-tuning typically involves manipulating the real time system operating point along the characteristic I-V curve of the photovoltaic modules. However, in accordance with at least some of the embodiments described herein, actually reducing the solar energy collection capability of the photovoltaic system by redirecting or tilting away one or more of the modules may provide benefits versus detuning at the inverter level. For example, in an embodiment, such benefits may include, a slower response time to assuage blips in the system versus a very fast inverter change time which may not be reducible, increased sensitivity to small changes in actual solar energy collection, more precise or granular control, or in cases when an inverter is actually offline. In an embodiment, such benefits may include eliminating or mitigating a compromise to inverter reliability.

Embodiments of the present invention may pertain to the functional requirements for tracker controller. For example, remote communication and computational capabilities of a tracker controller may include advanced control features that may be implemented somewhat easily when compared with other control approaches. Power plants that are associated with photovoltaic systems having tracker controllers are being constructed at an increasingly large scale and a central photovoltaic power plant market is developing. As such, control challenges may become increasingly important to resolve. In fact, it may be necessary to address this problem in order for a mature photovoltaic power plant market to grow to a significant scale. Embodiments of the present invention address this problem and are targeted for tracking photovoltaic and concentrating photovoltaic power plants.

Throughout each day, a tracking photovoltaic power plant may adjust the orientation of its solar panels with respect to the sun so that the panels receive the most direct sunlight possible, and thereby generate more electricity than an otherwise identical non-tracking power plant would. A concentrating photovoltaic power plant may use an optical package to collect sunlight from a large area and focus this light onto a smaller area of active solar cells (receiver). Throughout each day, a concentrating photovoltaic power plant may be adjusted with respect to the orientation of its collection optics pertaining to the position of the sun, such that the received sunlight is optimally focused onto the receiver. In accordance with an embodiment of the present invention, a photovoltaic system with managed output is applicable for both of these types of power plants, although the details of implementation may vary between flat plate photovoltaic and concentrating photovoltaic applications.

Presently, tracking systems often orient their panels or optics in two basic ways, neither of which are designed to provide the operator with control of plant output. In a first approach, the tracking system will orient its panels or receivers into a series of positions that are pre-calculated based on the known position of the sun in the sky for the yearly cycle. In a second approach, the tracking position is constantly adjusted based on feedback from optical sensors or the electrical output from the photovoltaic array itself, and will thereby seek the brightest area in the sky. In accordance with embodiments of the present invention, additional methods for controlling trackers that provide control of the power plant output are described. In one embodiment, the plant operator is enabled to control the electrical output of a tracking photovoltaic or concentrating photovoltaic power plant to an extent that may not be possible with conventional approaches. In a specific embodiment, intelligent control of the tracking system is used to deliberately adjust plant output. In an embodiment, a photovoltaic system includes a sensor configured to determine an orientation for each of the plurality of photovoltaic modules, the orientations based on a maximum output from the photovoltaic system. In one embodiment, the orientations are established for the purpose of collecting maximum solar energy. In a specific embodiment, the maximum output is established at a particular point in time, e.g., on a real-time basis.

Other methods for achieving this control functionality may include employing an energy storage system at the power plant, which can absorb energy from an array or dispatch energy to the grid on command, and therefore provide output control. However, at the present, no storage technology has yet been proven to be cost-effective for this specific application. By contrast, embodiments of the present invention may be implemented at very low cost. Another approach includes using existing Maximum Power Point Tracking functionality contained in an inverter or in an array. This is a power electronics technology that can essentially de-tune the electrical performance of the system such that the output for the photovoltaic system is reduced. However, this approach may be limited in capability or reliability. On the other hand, embodiments of the present invention include additional control capability not possible with Maximum Power Point Tracking tuning or de-tuning alone.

In aspects of the present invention, three specific envisioned control needs include: (1) minimizing plant output variability from changing atmospheric conditions (for example, cloud cover), (2) generating output-optimizing decisions, and (3) reduce cost by feathering photovoltaic DC output during highest-performing conditions. Embodiments of the present invention include one or more of the following features: (a) multiple solar tracking arrays, each containing tracking controllers capable of responding to commands and adjusting the array tracking angles accordingly, (b) a weather monitoring or prediction center, (c) a command center capable of making decisions either autonomously or with human operator input, with specialized software designed to perform the operations and functions described herein, and (d) a communications system which sends information and commands between the weather monitoring or prediction center, command center, and the tracker controllers.

With respect to specific envisioned control needs include (1), i.e. minimizing power plant output variability due to changing atmospheric conditions, the operation of embodiments of the present invention may include one or more of the following features: (a) a weather monitoring or prediction center calculates the characteristics of future atmospheric conditions over periodic intervals of time into the future, (b) a power plant system output is predicted over these periodic intervals of time into the future by the command center, based on the predicted atmospheric conditions from (a), assuming that tracking is carried out normally (e.g., based on an astronomical algorithm), (c) the command center evaluates the predicted power plant system output and maximum acceptable ramp-rates (both up and down) set by the operator, and predicts future events in which the plant output ramp-rate will exceed the acceptable limits, (d) for future events predicted to exceed acceptable ramp-rate limits, the command center will calculate a unique solution, in which the tracking controllers adjust the tracking angle in anticipation of the changing atmospheric conditions, such that the maximum allowable ramp-rate is not exceeded, (e) an evaluation process takes place to decide whether or not to implement each unique solution. In such an embodiment, solutions are evaluated automatically by the command center, and then possibly presented to the operator for decision in some circumstances. Certain solutions may be pre-determined to be not possible, possibly due to a limited amount of time that the system has to respond, or limitations due to the maximum rate that tracking angle can be changed. Such solutions may be disregarded by the command center without operator input. Other solutions may meet certain objective criteria but not all, and therefore require operator decision and judgment. Finally, some solutions may meet a full set of objective criteria and are decided upon by the command center. Additional features may include: (f) implementing all solutions per the most recent solution definition, (g) repeating the process outlined in (a)-(f) continuously.

With respect to specific envisioned control needs include (2), i.e. generating optimizing decisions, the operation of embodiments of the present invention may include one or more of the following features: (a) a weather monitoring or prediction center calculates the characteristics of future atmospheric conditions over periodic intervals of time into the future, (b) a power plant system output is predicted over these periodic intervals of time into the future by the command center, based on the predicted atmospheric conditions from (a), assuming that tracking is carried out normally (e.g., based on astronomical algorithm), (c) a command center models alternative tracking angles during future times in which the power plant output has fallen due to changing atmospheric conditions (e.g., during overcast conditions), and determines better or improved tracking angles for increased power plant output during such conditions (e.g., stowing the array), (d) optimized tracking events are implemented, either autonomously or with operator input, (e) the process outlined in (a)-(d) is repeated continuously.

With respect to specific envisioned control needs include (2), i.e. reducing cost by feathering photovoltaic DC output during highest-performing conditions, the operation of embodiments of the present invention may include one or more of the following features: (a) a weather monitoring or prediction center calculates the characteristics of future atmospheric conditions over periodic intervals of time into the future, (b) a power plant system output is predicted over these periodic intervals of time into the future by the command center, based on the predicted atmospheric conditions from (a), assuming that tracking is carried out normally (e.g., based on astronomical algorithm), (c) the command center identifies predicted situations in which the plant output will exceed a set maximum design value. Such a design value may be used to size many of the electrical components of the power plant, such as inverters and conductors, and could be exceeded very infrequently, such as times of year that are very sunny, very cool and breezy. Additional features may include: (d) the command center calculates a tracking solution in which the tracking arrays are de-tuned away from the sun, such that the maximum design output value is not exceeded, and implements this solution either autonomously or with input from operator, (e) the process outlined in (a)-(d) is repeated continuously.

Embodiments of the present invention may be provided in the form of software which pre-calculates a variety of plant-output scenarios, and presents the scenarios to a plant operator in a useful way for the purpose of making decisions. In some embodiments, cost to be removed from the electrical design by ensuring that the highest possible output of an associated photovoltaic system, which only happens very infrequently, is never provided to the power plant. In some embodiments, improved output on cloudy days may be achievable, without the need for guesswork by an operator.

In an aspect of the present invention, photovoltaic systems with managed output are described. FIG. 1 illustrates a block diagram of a photovoltaic system with managed output, in accordance with an embodiment of the present invention.

Referring to FIG. 1, a photovoltaic system 100 has managed output. Photovoltaic system 100 includes a plurality of photovoltaic modules 102 configured to receive and convert solar energy. Photovoltaic system 100 also includes a sensor 104 configured to determine an orientation for each of the plurality of photovoltaic modules 102, the orientations based on a maximum output from photovoltaic system 100. Also included is an orientation system (not shown) configured to alter the orientation of one or more (e.g., sub-block 106) of the plurality of photovoltaic modules 102 to provide a reduced output from photovoltaic system 100, the reduced output less than the maximum output. In an embodiment, photovoltaic system 100 further includes a power conditioning unit 108 coupled with the plurality of photovoltaic modules 102, as depicted in FIG. 1.

In accordance with an embodiment of the present invention, the orientation system is configured to alter the orientation of the one or more 106 of the plurality of photovoltaic modules 102 by tilting the one or more 106 of the plurality of photovoltaic modules 106 away from a direct solar energy pathway. In one such embodiment, photovoltaic system 100 further includes one or more solar tracker devices supporting the one or more 106 of the plurality of photovoltaic modules 102, and tilting the one or more 106 of the plurality of photovoltaic modules 102 away from the direct solar energy pathway includes changing the positioning of the one or more solar tracker devices. In another embodiment, the orientation system is configured to alter the orientation of the one or more 106 of the plurality of photovoltaic modules 102 by tilting the one or more 106 of the plurality of photovoltaic modules 102 from a high intensity diffuse solar energy pattern to a low intensity diffuse solar energy pattern. In one such embodiment, photovoltaic system 100 further includes one or more solar tracker devices supporting the one or more 106 of the plurality of photovoltaic modules 102, and tilting the one or more 106 of the plurality of photovoltaic modules 102 from the high intensity diffuse solar energy pattern to the low intensity diffuse solar energy pattern includes changing the positioning of the one or more solar tracker devices. In a specific embodiment, the one or more solar tracker devices includes a device such as, but not limited to, single-axis trackers, e.g., a T10 or T20 Tracker available from SunPower Corp., of San Jose, Calif., U.S.A, or multi-axis trackers.

In accordance with an embodiment of the present invention, photovoltaic system 100 is coupled with a power plant. The maximum output from photovoltaic system 100 is greater than the capacity of the power plant, and the reduced output is less than or equal to the capacity of the power plant.

In an embodiment, sensor 104 includes a pair of modules, each module positioned at a unique distance (e.g., L and L') from the plurality of photovoltaic modules 102. In one embodiment, the pair of modules is configured to provide a delta in energy detected by the pair of modules. For example, the difference in detected solar radiation at one module is subtracted from the solar radiation detected at the second module and correlated with distance and bearing (e.g. L vs. L'). When a collection event is detected or anticipated, information gleaned from sensor 104 may be used to determine how many modules to tilt away from maximum collection positioning, and to what extent to the tilting should be performed. Sensor 104 may further include or be associated with additional sensing systems or data sources to better target real time changes in energy input to the plurality of photovoltaic modules 102. For example, in an embodiment, sensor 104 further includes a network of insolation sensor modules arranged around the perimeter of, or interspersed with, photovoltaic system 100. In another embodiment, sensor 104 further includes a network of still cameras or a combination of still and video cameras. In an embodiment, photovoltaic system 100 further includes a secondary sensor coupled with sensor 104, secondary sensor composed of a sensor such as, but not limited to, an anemometer, a wind vane, a satellite data source, or a temperature sensor. In another embodiment, photovoltaic system 100 further includes a neural-network configured to compute a value for the future change in solar energy detected by sensor 104.

In accordance with an embodiment of the present invention, power conditioning unit 108 is configured to condition DC power from the plurality of photovoltaic modules 102. For example, in one embodiment, power conditioning unit 108 is an inverter, the inverter configured to invert, to AC power, DC power from the plurality of photovoltaic modules 102. In an alternative embodiment, power conditioning unit 108 conditions DC power from the plurality of photovoltaic modules 102 and then outputs the conditioned DC power.

Figure 2:
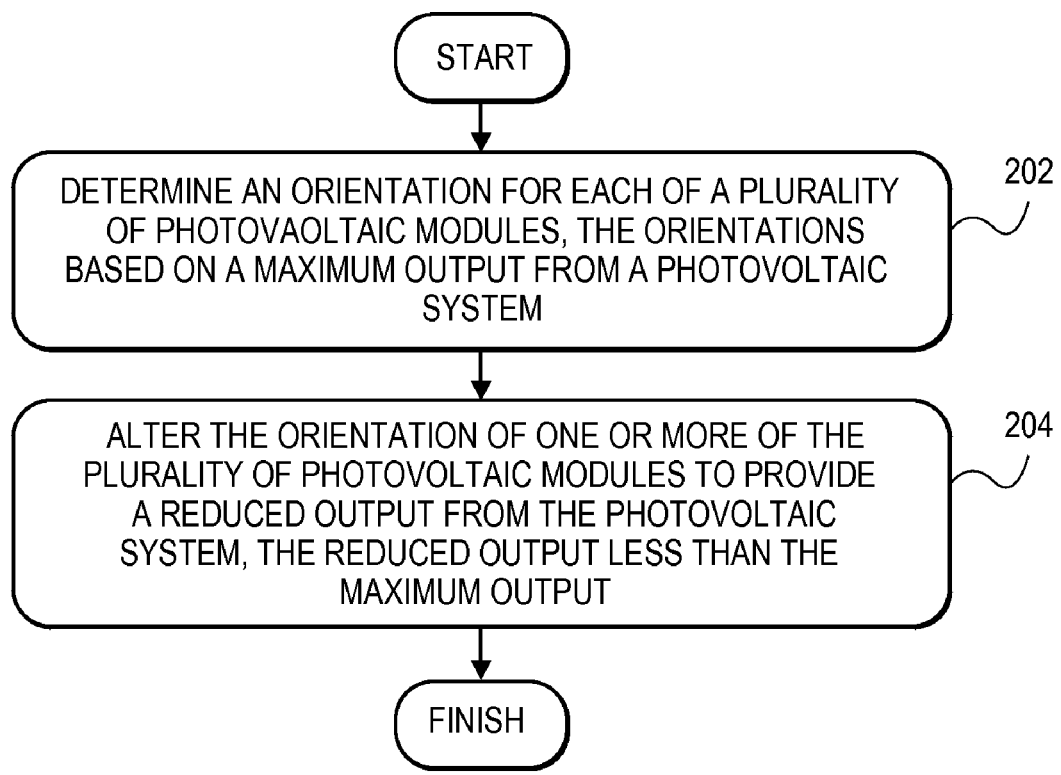
FIG. 2 illustrates a flowchart representing operations in a method of managing variability of output from a photovoltaic system, in accordance with an embodiment of the present invention.

In another aspect of the present invention, methods are provided for managing variability of output from photovoltaic systems. FIG. 2 illustrates a flowchart 200 representing operations in a method for managing variability of output from a photovoltaic system, in accordance with an embodiment of the present invention.

Referring to operation 202 of Flowchart 200, a method for managing variability of output from a photovoltaic system includes determining an orientation for each of a plurality of photovoltaic modules, the orientations based on a maximum output from the photovoltaic system.

Referring to operation 204 of Flowchart 200, the method for managing variability of output from a photovoltaic system further includes altering the orientation of one or more of the plurality of photovoltaic modules to provide a reduced output from the photovoltaic system, the reduced output less than the maximum output. In accordance with an embodiment of the present invention, altering the orientation of the one or more of the plurality of photovoltaic modules comprises tilting the one or more of the plurality of photovoltaic modules away from a direct solar energy pathway. In one such embodiment, tilting the one or more of the plurality of photovoltaic modules away from the direct solar energy pathway comprises changing the positioning of one or more solar tracker devices supporting the one or more of the plurality of photovoltaic modules. In accordance with another embodiment of the present invention, altering the orientation of the one or more of the plurality of photovoltaic modules comprises tilting the one or more of the plurality of photovoltaic modules from a high intensity diffuse solar energy pattern to a low intensity diffuse solar energy pattern. In one such embodiment, tilting the one or more of the plurality of photovoltaic modules from the high intensity diffuse solar energy pattern to the low intensity diffuse solar energy pattern comprises changing the positioning of one or more solar tracker devices supporting the one or more of the plurality of photovoltaic modules. In an embodiment, when a collection event is detected or anticipated, information gleaned from a sensor is used to determine how many modules to tilt away from maximum collection positioning, and to what extent to the tilting should be performed.

In accordance with another embodiment of the present invention, a method for managing variability of output from a photovoltaic system includes providing a plurality of photovoltaic modules, each photovoltaic module having a solar energy collection capability. The method also includes reducing a solar energy collection capability of one or more of the plurality of photovoltaic modules to provide a reduced output from the photovoltaic system, the reduced output less than a maximum output from the photovoltaic system. In one embodiment, the maximum possible output from the photovoltaic system is greater than the capacity of a power plant coupled with the photovoltaic system, and wherein the reduced output is less than or equal to the capacity of the power plant.

In an aspect of the present invention, embodiments of the inventions are provided as a computer program product, or software product, that includes a machine-readable medium having stored thereon instructions, which is used to program a computer system (or other electronic devices) to perform a process or method according to embodiments of the present invention. A machine-readable medium may include any mechanism for storing or transmitting information in a form readable by a machine (e.g., a computer). For example, in an embodiment, a machine-readable (e.g., computer-readable) medium includes a machine (e.g., a computer) readable storage medium (e.g., read only memory ("ROM"), random access memory ("RAM"), magnetic disk storage media or optical storage media, flash memory devices, etc.).

Figure 3:
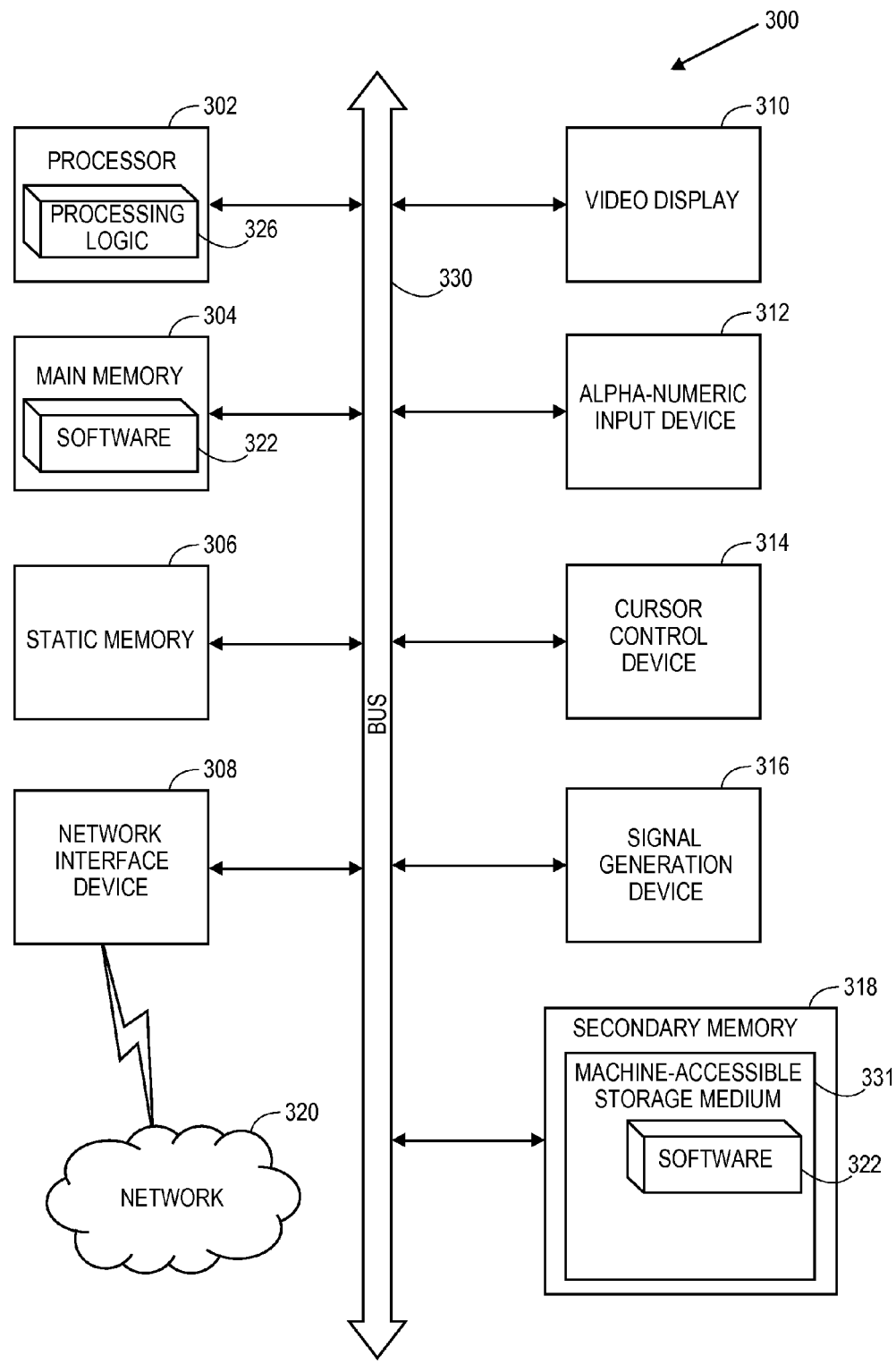
FIG. 3 illustrates a block diagram of an example of a computer system configured for performing a method of managing variability of output from a photovoltaic system, in accordance with an embodiment of the present invention.

FIG. 3 illustrates a diagrammatic representation of a machine in the form of a computer system 300 within which a set of instructions, for causing the machine to perform any one or more of the methodologies discussed herein, is executed. For example, in accordance with an embodiment of the present invention, FIG. 3 illustrates a block diagram of an example of a computer system configured for performing a method of managing variability of output from a photovoltaic system. In alternative embodiments, the machine is connected (e.g., networked) to other machines in a Local Area Network (LAN), an intranet, an extranet, or the Internet. In an embodiment, the machine operates in the capacity of a server or a client machine in a client-server network environment, or as a peer machine in a peer-to-peer (or distributed) network environment. In an embodiment, the machine is a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers or processors) that individually or jointly execute a set (or multiple sets) of instructions to perform any one or more of the methodologies discussed herein.

The example of a computer system 300 includes a processor 302, a main memory 304 (e.g., read-only memory (ROM), flash memory, dynamic random access memory (DRAM) such as synchronous DRAM (SDRAM), etc.), a static memory 306 (e.g., flash memory, static random access memory (SRAM), etc.), and a secondary memory 318 (e.g., a data storage device), which communicate with each other via a bus 330. In an embodiment, a data processing system is used.

Processor 302 represents one or more general-purpose processing devices such as a microprocessor, central processing unit, or the like. More particularly, in an embodiment, the processor 302 is a complex instruction set computing (CISC) microprocessor, reduced instruction set computing (RISC) microprocessor, very long instruction word (VLIW) microprocessor, processor implementing other instruction sets, or processors implementing a combination of instruction sets. In one embodiment, processor 302 is one or more special-purpose processing devices such as an application specific integrated circuit (ASIC), a field programmable gate array (FPGA), a digital signal processor (DSP), network processor, or the like. Processor 302 executes the processing logic 326 for performing the operations discussed herein.

In an embodiment, the computer system 300 further includes a network interface device 308. In one embodiment, the computer system 300 also includes a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

In an embodiment, the secondary memory 318 includes a machine-accessible storage medium (or more specifically a computer-readable storage medium) 331 on which is stored one or more sets of instructions (e.g., software 322) embodying any one or more of the methodologies or functions described herein, such as a method for managing variability of output from a photovoltaic system. In an embodiment, the software 322 resides, completely or at least partially, within the main memory 304 or within the processor 302 during execution thereof by the computer system 300, the main memory 304 and the processor 302 also constituting machine-readable storage media. In one embodiment, the software 322 is further transmitted or received over a network 320 via the network interface device 308.

While the machine-accessible storage medium 331 is shown in an embodiment to be a single medium, the term "machine-readable storage medium" should be taken to include a single medium or multiple media (e.g., a centralized or distributed database, or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of embodiments of the present invention. The term "machine-readable storage medium" shall accordingly be taken to include, but not be limited to, solid-state memories, and optical and magnetic media.

It is to be understood that embodiments of the present invention may be relevant where the size of a photovoltaic system is such that it has a material impact on the operation or maintenance of a utility power system. In one embodiment, the material impact occurs at a level where the peak power of the photovoltaic system is significant relative to the peak capacity of the portion of the grid the system that it is tied into. In a specific embodiment, the level is approximately above 10% of a feeder, a substation, or a regulation service capacity. However, other embodiments are not limited to such levels.

Thus, photovoltaic systems with managed output and methods of managing variability of output from photovoltaic systems have been disclosed. In accordance with an embodiment of the present invention, a system includes a plurality of photovoltaic modules configured to receive and convert solar energy. The system also includes a sensor configured to determine an orientation for each of the plurality of photovoltaic modules, the orientations based on a maximum output from the photovoltaic system. The system also includes an orientation system configured to alter the orientation of one or more of the plurality of photovoltaic modules to provide a reduced output from the photovoltaic system, the reduced output less than the maximum output. In one embodiment, the orientation system is configured to alter the orientation of the one or more of the plurality of photovoltaic modules by tilting the one or more of the plurality of photovoltaic modules away from a direct solar energy pathway. In one embodiment, the orientation system is configured to alter the orientation of the one or more of the plurality of photovoltaic modules by tilting the one or more of the plurality of photovoltaic modules from a high intensity diffuse solar energy pattern to a low intensity diffuse solar energy pattern.

What is claimed is:

1. An apparatus comprising:
a photovoltaic system with managed output, the system comprising:
a plurality of photovoltaic modules configured to receive and convert solar energy;
a sensor configured to determine an orientation for each of the plurality of photovoltaic modules, the orientations based on a maximum output from the photovoltaic system; and
an orientation system configured to alter the orientation of one or more modules of the plurality of photovoltaic modules to provide a reduced output from the photovoltaic system, the reduced output less than the maximum output wherein the orientation system is configured to alter the orientation of the one or more modules of the plurality of photovoltaic modules by tilting the one or more modules of the plurality photovoltaic modules by tilting the one or more modules of the plurality of photovoltaic modules away from a direct solar energy pathway, and wherein an output from the sensor is used to determine how many modules to tilt away from maximum collection positioning, and to what extent to the tilting should be performed.

2. The photovoltaic system of claim 1, further comprising:
one or more solar tracker devices supporting the one or more modules of the plurality of photovoltaic modules, wherein tilting the one or more modules of the plurality of photovoltaic modules away from the direct solar energy pathway comprises changing the positioning of the one or more solar tracker devices.

3. The photovoltaic system of claim 1, further comprising:
a power plant coupled with the photovoltaic system, wherein the maximum output from the photovoltaic system is greater than the capacity of the power plant, and wherein the reduced output is less than or equal to the capacity of the power plant.

4. A method comprising:
managing variability of output from a photovoltaic system, the managing comprising:
determining an orientation for each of a plurality of photovoltaic modules, the orientations based on a maximum output from the photovoltaic system; and
altering the orientation of one or more modules of the plurality of photovoltaic modules to provide a reduced output from the photovoltaic system, the reduced output less than the maximum output wherein altering the orientation of the one or more modules of the plurality of photovoltaic modules comprises tilting the one or more modules of the plurality photovoltaic modules away from a direct solar energy pathway, and wherein an output from the sensor is used to determine how many modules to tilt away from maximum collection positioning, and to what extent to the tilting should be performed.

5. The method of claim 4, wherein tilting the one or more modules of the plurality of photovoltaic modules away from the direct solar energy pathway comprises changing the positioning of one or more solar tracker devices supporting the one or more modules of the plurality of photovoltaic modules.

6. The method of claim 4, wherein the maximum output from the photovoltaic system is greater than the capacity of a power plant coupled with the photovoltaic system, and wherein the reduced output is less than or equal to the capacity of the power plant.

7. A machine-accessible non-transitory storage medium having instructions stored thereon which cause a data processing system to perform a method comprising:
  managing variability of output from a photovoltaic system, the managing comprising:
   determining an orientation for each of a plurality of photovoltaic modules, the orientations based on a maximum output from the photovoltaic system; and
   altering the orientation of one or more modules of the plurality of photovoltaic modules to provide a reduced output from the photovoltaic system, the reduced output less than the maximum output wherein altering the orientation of the one or more modules of the plurality of photovoltaic modules comprises tilting the one or more modules of the plurality photovoltaic modules away from a direct solar energy pathway, and wherein an output from the sensor is used to determine how many modules to tilt away from maximum collection positioning, and to what extent to the tilting should be performed.

8. The machine-accessible non-transitory storage medium of claim 7, wherein tilting the one or more modules of the plurality of photovoltaic modules away from the direct solar energy pathway comprises changing the positioning of one or more solar tracker devices supporting the one or more modules of the plurality of photovoltaic modules.

9. The machine-accessible non-transitory storage medium of claim 7, wherein the maximum output from the photovoltaic system is greater than the capacity of a power plant coupled with the photovoltaic system, and wherein the reduced output is less than or equal to the capacity of the power plant.

* * * * *

UNITED STATES PATENT AND TRADEMARK OFFICE
CERTIFICATE OF CORRECTION

PATENT NO.          : 8,334,489 B2
APPLICATION NO.     : 12/721372
DATED               : December 18, 2012
INVENTOR(S)         : Greg Beardsworth et al.

It is certified that error appears in the above-identified patent and that said Letters Patent is hereby corrected as shown below:

In the Claims

Column 10, Claim 1, lines 17-18, delete "by tilting the one or more modules of the plurality photovoltaic modules".

Signed and Sealed this
Eighteenth Day of March, 2014

Michelle K. Lee
*Deputy Director of the United States Patent and Trademark Office*